United States Patent
Narasimhan

(10) Patent No.: US 7,924,717 B2
(45) Date of Patent: Apr. 12, 2011

(54) SYSTEMS AND METHODS OF HANDLING ACCESS CONTROL VIOLATIONS

(75) Inventor: Hrishikesh Narasimhan, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 12/394,466

(22) Filed: Feb. 27, 2009

(65) Prior Publication Data

US 2010/0223658 A1     Sep. 2, 2010

(51) Int. Cl.
*G04B 25/02*     (2006.01)

(52) U.S. Cl. .......... 370/230; 370/461; 711/145

(58) Field of Classification Search .......... 370/230, 370/438, 447, 461; 711/100, 145; 713/165, 713/154; 726/13; 709/224, 238
See application file for complete search history.

(56) References Cited

U.S. PATENT DOCUMENTS

| | | | |
|---|---|---|---|
| 2005/0055573 | A1 | 3/2005 | Smith |
| 2006/0077964 | A1* | 4/2006 | Wu et al. ............... 370/352 |
| 2006/0294297 | A1 | 12/2006 | Gupta |
| 2007/0022479 | A1 | 1/2007 | Sikdar et al. |
| 2007/0028039 | A1* | 2/2007 | Gupta et al. ............ 711/108 |
| 2007/0263591 | A1* | 11/2007 | Diachina et al. ........ 370/351 |
| 2008/0104393 | A1 | 5/2008 | Glasser et al. |

* cited by examiner

*Primary Examiner* — Seema S Rao
*Assistant Examiner* — Henry Baron

(57) ABSTRACT

Systems and methods of reporting access violations in a network device are disclosed. One such method comprises setting a forwarding index field in a specific entry of an access control list (ACL) to reference a specific forwarding table entry (FTE). The specific FTE is the only FTE associated with reporting access violations. The method further comprises setting a next destination field in the specific FTE to indicate a copy-to-processor behavior. The method further comprises setting the next destination field in the specific FTE to indicate a drop behavior. The setting of the next destination field is responsive to a timeout on a timer associated with reporting access violations.

15 Claims, 8 Drawing Sheets

SYSTEMS AND METHODS OF HANDLING ACCESS CONTROL VIOLATIONS

BACKGROUND

Network devices which implement access control policies or criteria in order to filter out or drop packets can typically be configured to log or report violations of these policies. In order to report not only the violation itself but details about the packet which caused the violation, the packet is copied to the main processor, which consumes bus and/or processor bandwidth.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

The inventive techniques disclosed herein allow efficient logging of access control violations by utilizing an access control list in conjunction with a forwarding table. By using one specific entry within the forwarding table in combination with an indirect forwarding index within the access control list, reporting of access violations to a host processor can be efficiently enabled or disabled by changing this single forwarding table entry. Disabling such reporting is sometimes desirable because providing packets to host processor consumes bus bandwidth, and without this technique, disabling involves updating multiple entries in access control list.

Figure 1:
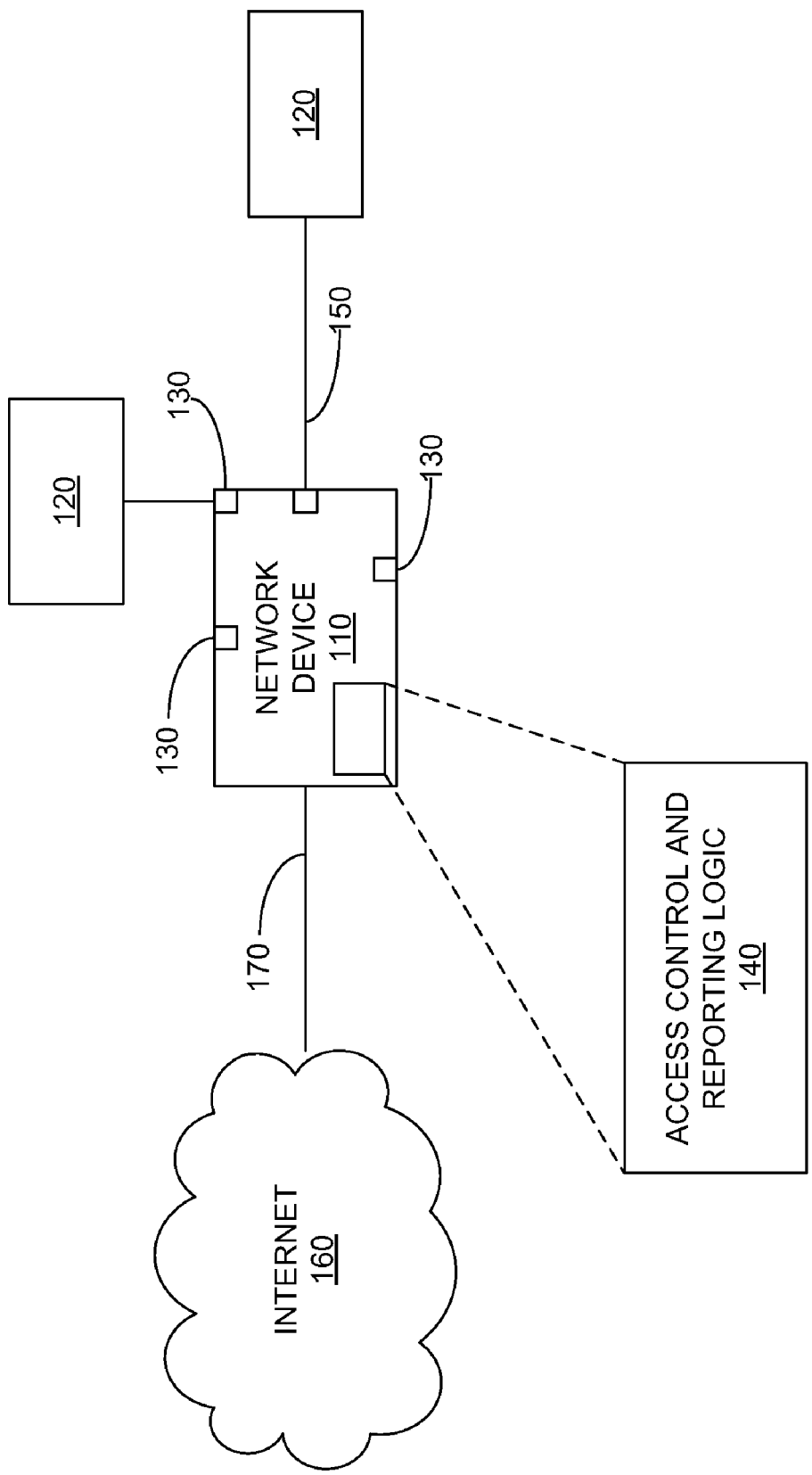
FIG. 1 is a block diagram of a network including a network device which implements efficient logging of access control violations.

FIG. 1 is a block diagram of a network including a network device which implements efficient logging of access control violations. A network device 110 receives packets from network nodes 120 through one or more ports 130 (also known as "network interfaces"). Using various policies and/or criteria, access control and reporting logic 140 (residing in network device 110) decides whether the packets will be forwarded through device 110, or will instead be dropped. For example, one policy might specify that all IP packets received from a specific subnet are permitted to transit, while another might specify that all Real-Time Transport (RTP) packets are to be dropped is notified when a received packet fails a policy/criteria, and may perform various logging and/or notification functions such as writing the violation to a file, displaying the violation on a screen, sending a Simple Network Management Protocol (SNMP) message that describes the violation to another device, etc.

Network device 110 is a general term intended to encompass any device which performs this access control function, which may include (but is not limited to) a firewall, a router, a switch, etc. In the example network of FIG. 1, network device 110 is coupled to a local area network (LAN) segment through LAN link 150, and to the Internet 160 through a wide area network (WAN) link 170. Other types of links are also intended to be within the scope of this disclosure.

Figure 2:
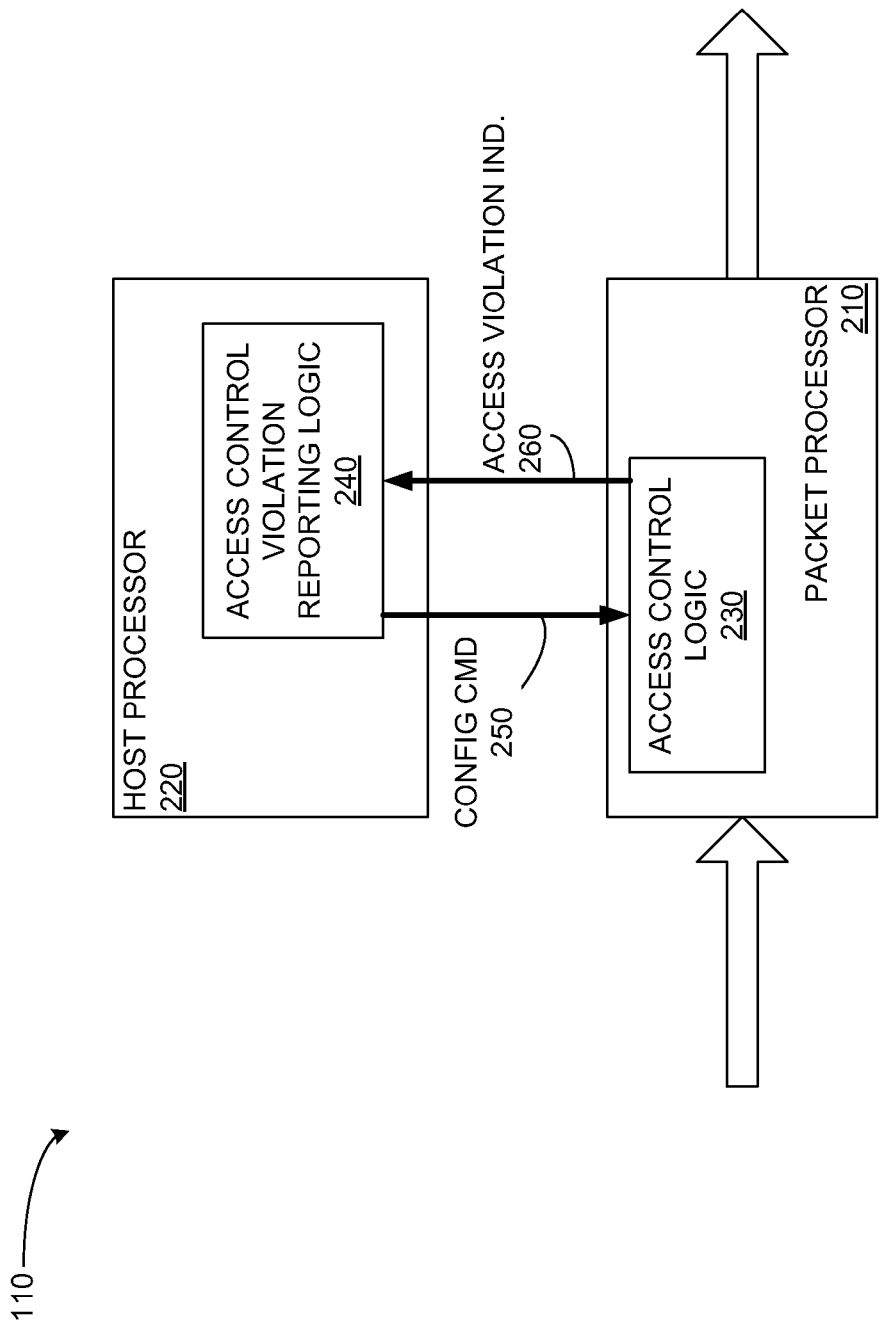
FIG. 2 is a block diagram of selected components of the network device from FIG. 1.

FIG. 2 is a block diagram of selected components of network device 110, in which functionality is divided between a packet processor 210 (implementing the data plane) and a host processor 220 (implementing the control plane). In particular, packet processor 210 implements access control logic 230, which determines whether a packet is passed through or dropped. In some implementations, access control logic 230 corresponds to a packet classifier. Packet processor 210 also determines where the packet is forwarded in some implementations of network device 110 (e.g., routers).

Host processor 220 controls the behavior of packet processor 210 by configuring packet processor 210 in various ways, based on user input, and on information received in packets and passed from packet processor 210 to host processor 220. Specifically, access control violation reporting logic 240 configures an access control list (access control list 310 in FIG. 3), by issuing a configuration command 250. Packet processor 210 also notifies host processor 220 of errors or exceptions. In particular, packets which violate an access control rule are passed to access control violation reporting logic 240 through an access violation indication 260.

Figure 3:
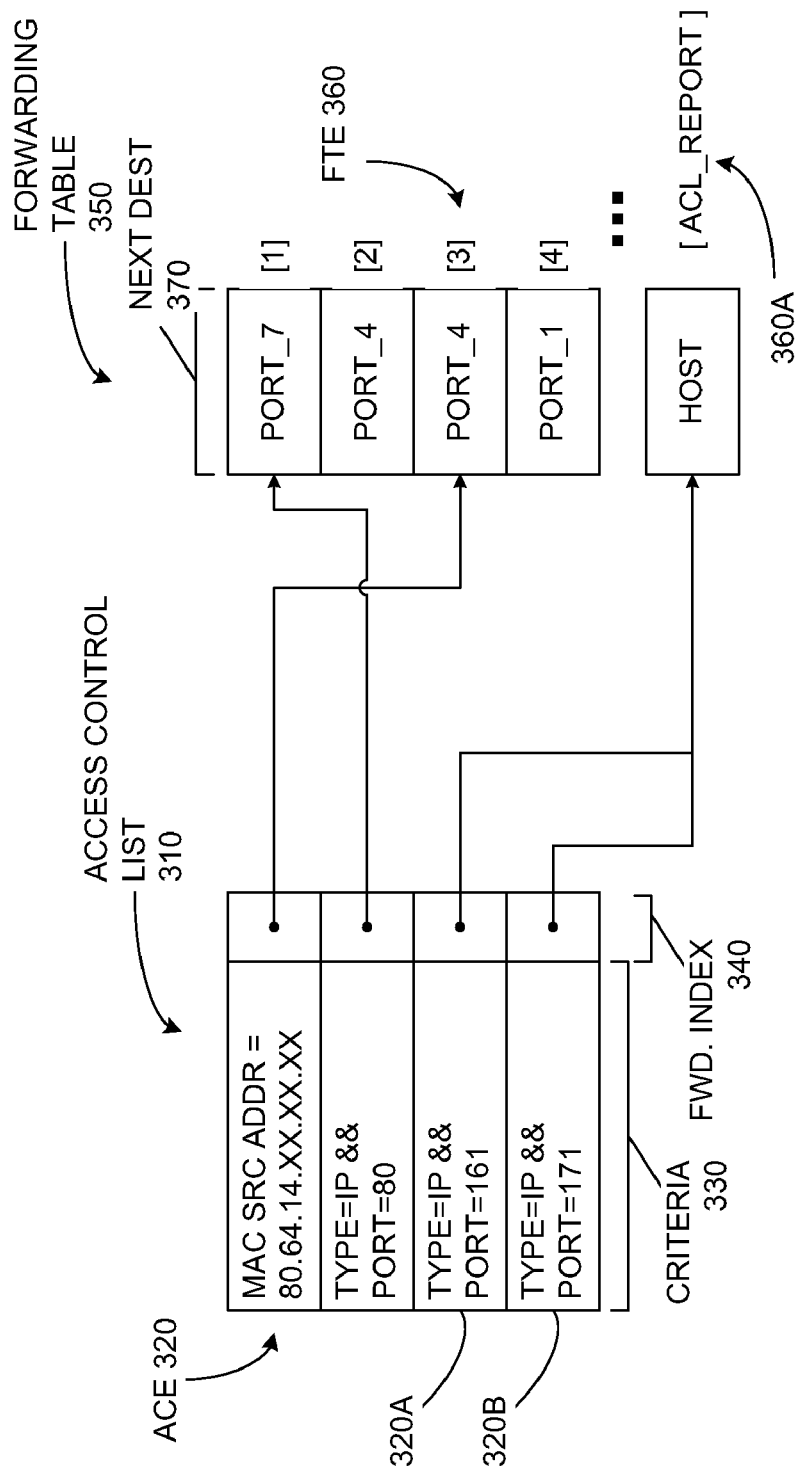
FIG. 3 is a diagram of various data structures used by the access control logic and access control violation reporting logic from FIG. 2.

FIG. 3 is a diagram of various data structures used by access control logic 230 and access control violation reporting logic 240. An access control list 310 includes one or more access control entries 320, where each access control entry 320 includes a packet criteria 330 and a forwarding index 340. A packet criteria 330 specifies (either explicitly or implicitly) particular fields of a packet, along with particular values. As each packet is received, access control logic 230 compares the data values in the specified fields of the packet to the values in a packet criteria 330. Comparing packets with access control list 310 can be implemented in various ways, such as a software-based sequential search of a table stored in random access memory, a hardware-based simultaneous search of a content-addressable memory, a combination of the two, or any other implementation known to a person of ordinary skill in the art.

If a match of packet data with criteria 330 detected, packet processor 210 uses the forwarding index 340 for the matching packet criteria 330 to determine an action to be taken on the packet. The end result is either dropping the packet or passing the packet through. If the packet is dropped, this is considered an access violation and this may be reported to access control violation reporting logic 240.

In existing systems, an access control entry (ACE) directly specifies one of the following actions to be taken by packet processor 210: permit; drop and report the packet to host processor 220; and drop without reporting the packet to host processor 220. In contrast, access control list 310 as disclosed herein does not directly specify an action. Instead, the action is indirectly specified by forwarding index 340, which is an index into a separate data structure, a forwarding table 350. That is, forwarding index 340 refers to one of the forwarding table entries 360 in forwarding table 350.

When a packet matches one of the packet criteria 330 in access control list 310, packet processor 210 uses the corresponding forwarding index 340 to find a forwarding table entry 360. Each forwarding table entry 360 includes a next destination 370 field, where the next destination corresponds to an internal destination within network device 110, such as one of network interfaces 130, or host processor 220, or a null interface. Packet processor 210 then disposes of the packet according to next destination 370. As a result, the packet may be: transferred to a network interface 130, and thus be forwarded to another (remote) device; provided to host processor 220, and specifically to access control violation reporting logic 240; or provided to the null interface—which, by not forwarding to an actual interface, has the effect of dropping the packet.

In the implementation shown in FIG. 3, host processor 220 fills in and manages forwarding table 350 so that one entry is reserved for use by access control violation reporting logic 240 so that packets which violate particular ACEs are either provided to host processor 220 or dropped. Specifically, in this entry (represented in FIG. 3 by "ACL_REPORT") next destination 370 is toggled between a value representing host processor 220 (this value is referred to herein as "HOST") and another value representing the null interface (referred to herein as "NULL"). For example, in FIG. 3, ACL entry 320A and entry 320B each have forwarding index 340 set to the same "ACL_REPORT" entry in forwarding table 350. Thus, this "ACL_REPORT" entry determines the reporting behavior for entry 320A and for entry 320B: if a packet violates either of these two ACLs, the packet is provided to host processor 220, or not, depending on the current value of the "ACL_REPORT" entry ("HOST" or "DROP").

By using one specific entry within forwarding table 350 in combination with an indirect forwarding index within access control list 310, access control violation reporting logic 240 can efficiently enable or disable reporting of access violations to host processor 220 by changing this single forwarding table entry. Disabling such reporting is sometimes desirable because providing packets to host processor 220 consumes bus bandwidth, and without this technique, disabling involves updating multiple entries in access control list 310. In some implementations, reporting is initially enabled but is disabled by access control violation reporting logic 240 when the first access violation is reported. In some implementations, reporting is enabled again by logic 240 after a fixed period, such that violations are reported every N minutes (or seconds, hours, etc.)

Details of enabling and disabling access violation reporting for the implementation of FIG. 3 will now be discussed in connection with FIG. 4, which is a flowchart illustrating operation of access control violation reporting logic 240 (performed by host processor 220). Logic 240 performs various functions related to reporting violations, each represented by an input arrow into FIG. 4. These different paths may be invoked as a result of corresponding function calls, messages, events, or other mechanisms which should be familiar to a person of ordinary skill in the art.

Incoming path 410 represents the EnableGlobalReporting function, which controls how reporting for any access control violation is handled. In some implementations, this path is invoked during initialization of host processor 220. When path 410 is invoked, block 420 sets the next destination field of the ACL_LOG entry in the forwarding table to the value "HOST". Block 430 begins an iteration loop, covering all ACEs that have been configured to report violations (e.g., according to a configuration database or table). Within the loop, block 440 sets the forwarding index field for the current ACE to the value "ACL_LOG", and the loop continues with the next iteration. When all ACEs have been handled, the loop has completed and block 450 starts an ACL reporting timer. (This timer block is optional, and may be user configurable.) As described earlier, a violation of one of those ACEs, packet processor 210 follows the forwarding index to the ACL_LOG entry. Since this entry indicates the next destination is host processor 220, the packet which caused the violation is copied to host processor 220.

This copy invokes incoming path 460. When this path is invoked, block 470 reports the violation (e.g., writing to a file, sending an SNMP message, etc.). Block 480 sets the next destination field of the ACL_LOG entry in the forwarding table to the value "NULL". As explained above, upon an access violation packet processor 210 follows the forwarding index to the ACL_LOG entry. Since this entry indicates the next destination is the null destination, the packet which caused the violation is discarded, which means host processor 220 is not notified and does not report the violation. Therefore, before the action in block 480, access violations resulted in a copy of the packet to host processor 220—but after this action, the packets are discarded instead of copied. Without such a change, host processor 220 is likely to be flooded with packets reporting access violations.

Path 490 is invoked upon expiration of the ACL reporting timer set by path 410. When this path is invoked, block 495 sets the next destination field of the ACL_LOG entry in the forwarding table to the value "HOST". As explained above, upon an access violation packet processor 210 follows the forwarding index to the ACL_LOG entry. Since this entry indicates the next destination is host processor 220, the packet which caused the violation is once again copied to host processor 220 (and once again invoking path 460).

Figure 4:
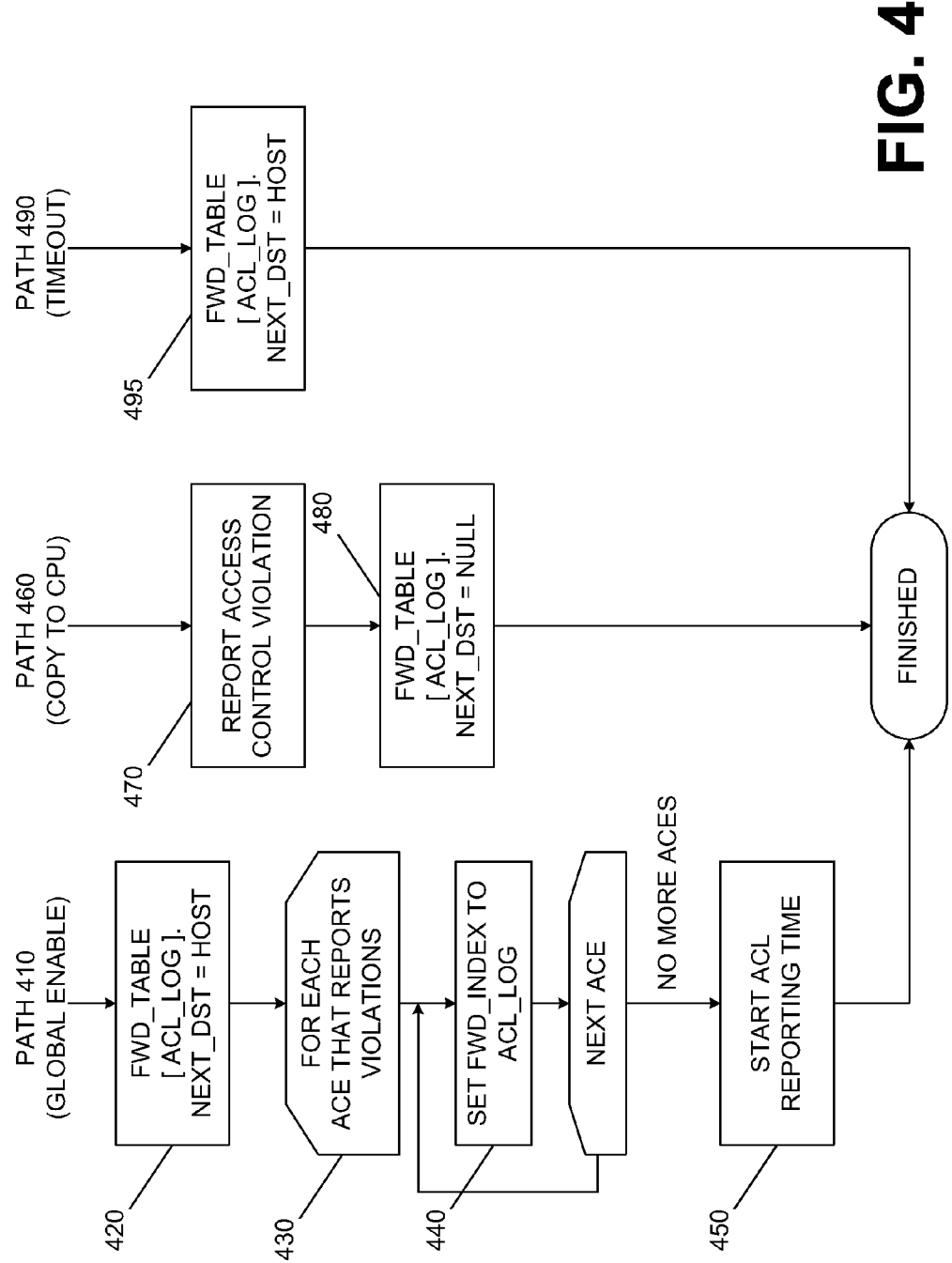
FIG. 4 is a flowchart illustrating operation of one implementation of the access control violation reporting logic from FIG. 2.
Figure 5:
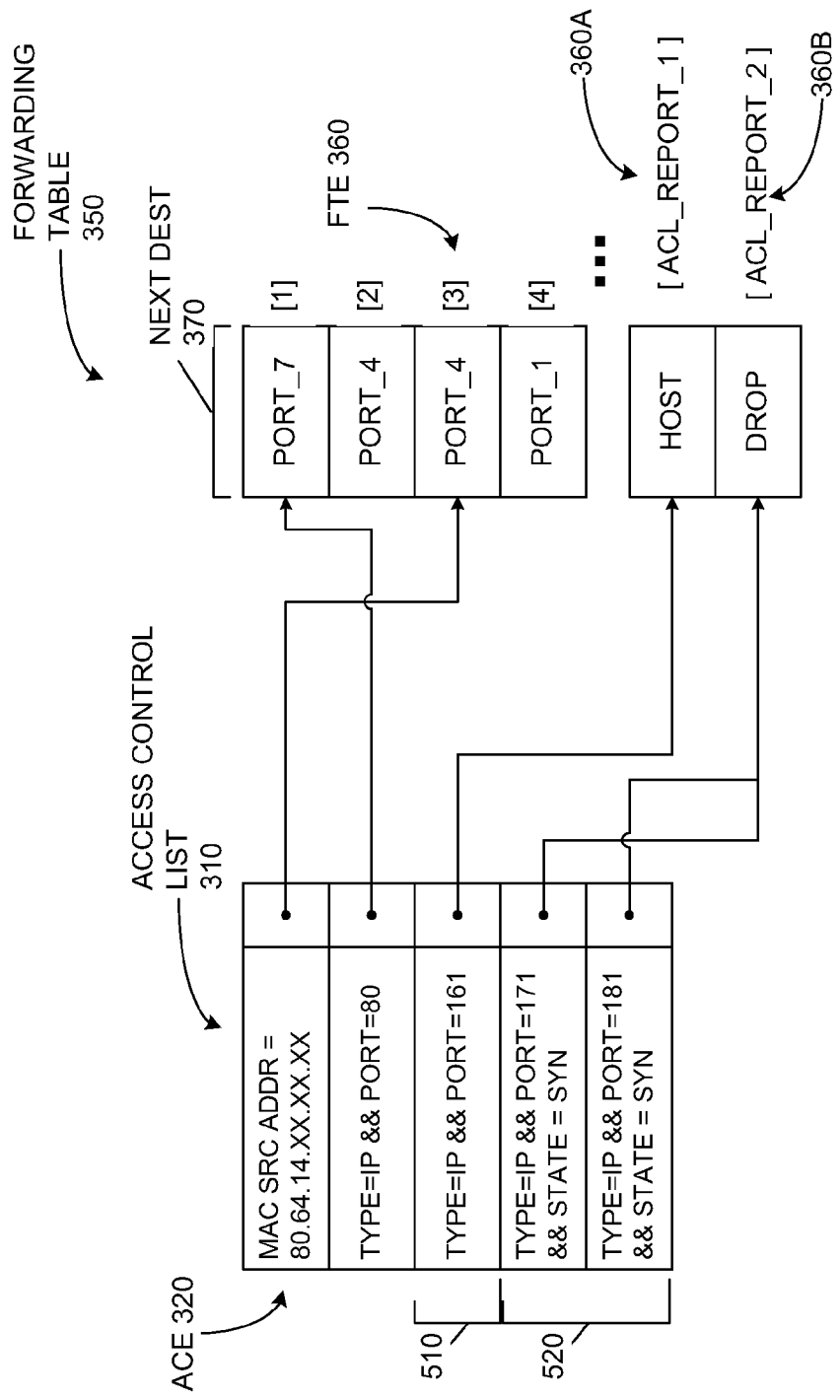
FIG. 5 is a block diagram showing the operation of one implementation of the packet processor from FIG. 2.

The implementations described in FIGS. 3 and 4 uses a single entry within forwarding table 350 to control reporting of access violations. Another implementation, described in connection with FIGS. 5 and 6, uses multiple entries within forwarding table 350. The implementation of FIG. 5 is similar to FIG. 3 except that ACEs for which reporting of violations is desired can be grouped, where each group corresponds to a different forwarding table entry. As shown in FIG. 5, ACE group 510 includes a single ACE, which points to FTE 360A. ACE group 520 includes two ACEs, each of which point to FTE 360B. Notably, these two FTEs have two different values such that, in the state shown in FIG. 5, packets violating the ACE in group 510 are provided to host processor 220 while packets violating the either of the ACEs in group 520 are dropped. Thus, this implementation provides more flexibility than the implementation of FIGS. 3 and 4

Figure 6:
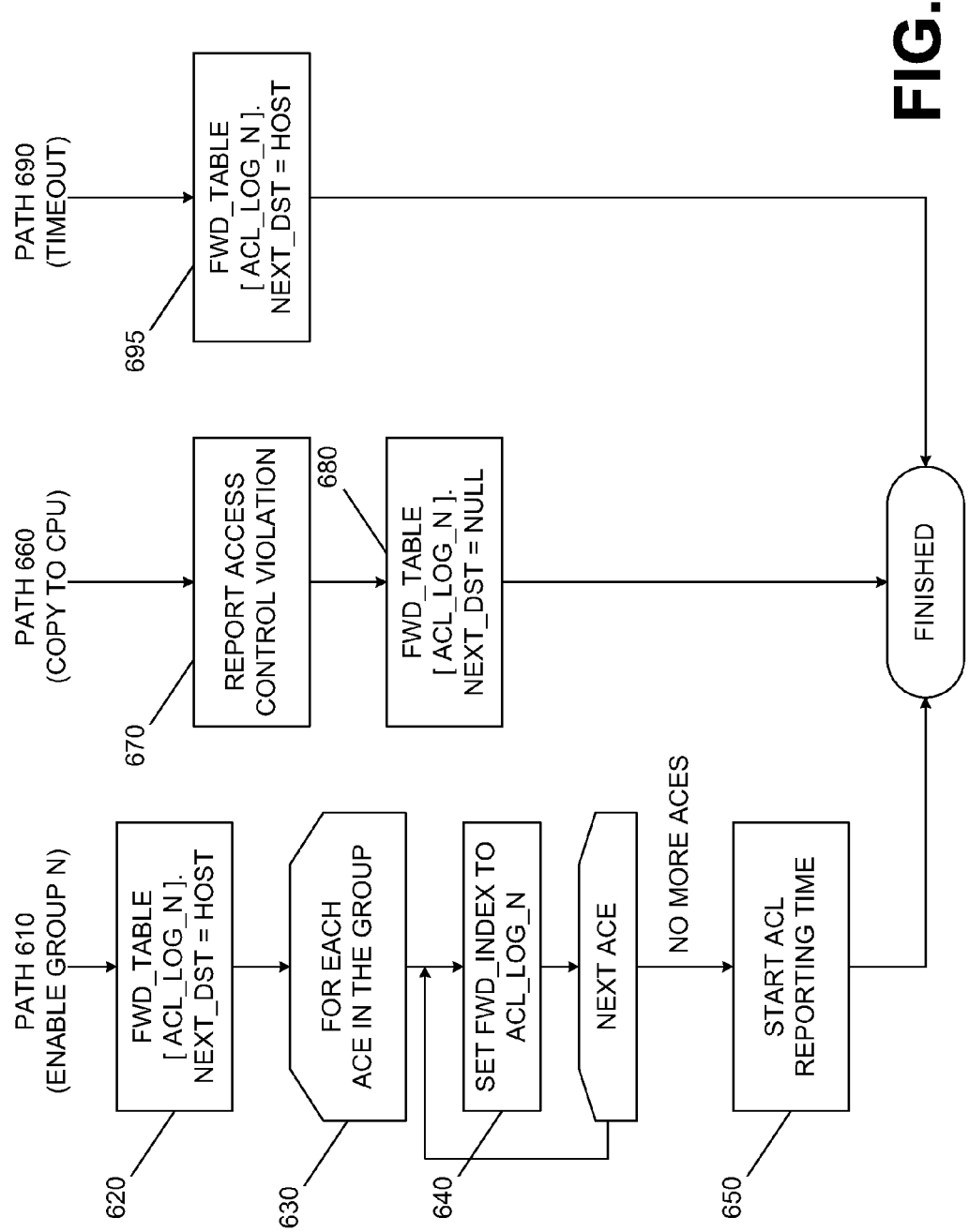
FIG. 6 is a flowchart illustrating operation of another implementation of the access control violation reporting logic from FIG. 2.

Details of enabling and disabling access violation reporting for the implementation of FIG. 5 will now be discussed in connection with the flowchart of FIG. 6. Incoming path 610 represents the EnableGroup|Reporting function, which controls reporting of access control violations for a particular group (group N). When path 610 is invoked, block 620 sets the next destination field of the ACL_LOG entry in the forwarding table to the value "HOST". Block 630 begins an iteration loop, covering all ACEs in group N (e.g., as specified in a configuration database or table). Within the loop, block 640 sets the forwarding index field for the current ACE to a value associated with the group ("ACL_LOG_N"), and the loop continues with the next iteration. When all ACEs in the group have been handled, the loop has completed and block 650 starts an ACL group reporting timer. (This timer block is optional, and may be user configurable.) As described earlier, a violation of one of those ACEs, packet processor 210 follows the forwarding index to the ACL_LOG_N entry (an entry specific to group N). Since this entry indicates the next destination is host processor 220, the packet which caused the violation is copied to host processor 220.

This copy invokes incoming path 660. When this path is invoked, block 670 reports the violation for the ACE group (e.g., writing to a file, sending an SNMP message, etc.). Block 680 sets the next destination field of the ACL_LOG_N entry in the forwarding table to the value "NULL". As explained above, upon an access violation packet processor 210 follows the forwarding index to the ACL_LOG_N entry. Since this entry indicates the next destination is the null destination, the packet which caused the violation is discarded, which means host processor 220 is not notified and does not report the violation. Therefore, before the action in block 680, access violations resulted in a copy of the packet to host processor 220—but after this action, the packets are discarded instead of copied. Without such a change, host processor 220 is likely to be flooded with packets reporting access violations.

Path 690 is invoked upon expiration of the ACL reporting timer set by path 610. When this path is invoked, block 695 sets the next destination field of the ACL_LOG_N entry in the forwarding table to the value "HOST". As explained above, upon an access violation packet processor 210 follows the forwarding index to the ACL_LOG_N entry. Since this entry indicates the next destination is host processor 220, the packet which caused the violation is once again copied to host processor 220 (and once again invoking path 660).

Figure 7:
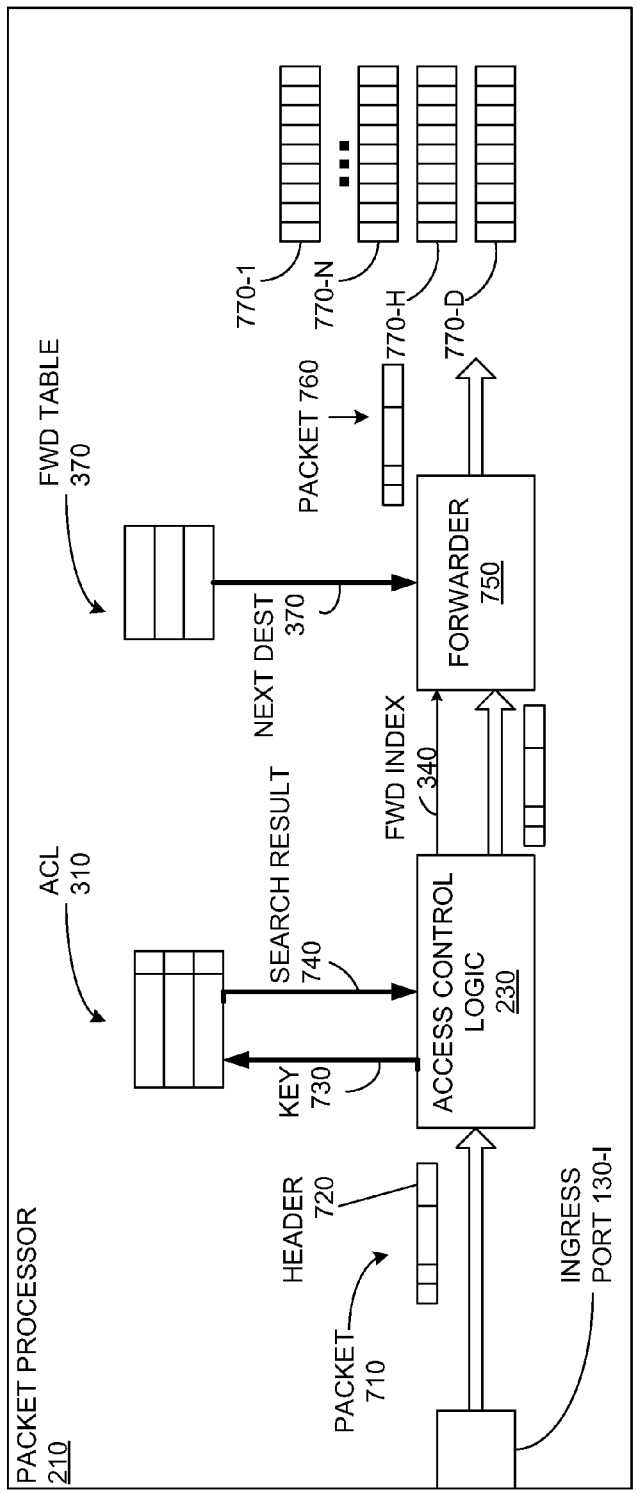
FIG. 7 is a block diagram showing the operation of another implementation of the packet processor from FIG. 2.

FIG. 7 is a block diagram showing the operation and structure of packet processor 210 in more detail. In this example, packet processor 210 is illustrated as two separate components (access control logic 230 and forwarder 750), but this division of functionality is only a logical convenience. Packet processor 210 receives packet 710 at ingress port 130-I. Access control logic 230 uses one or more header fields (720) of the ingress packet as a key 730 to search access control list 310. Access control logic 230 provides search result 740 to forwarder 750 as a forwarding index 340 into forwarding table 350. Forwarder 750 obtains the corresponding next destination 370 from forwarding table 350, then disposes of packet 760 by adding it to one of the packet queue 770 that is indicated by next destination 370: one of the port-specific queues 770-1 . . . N; drop queue 770-D; or host processor queue 770-H.

Figure 8:
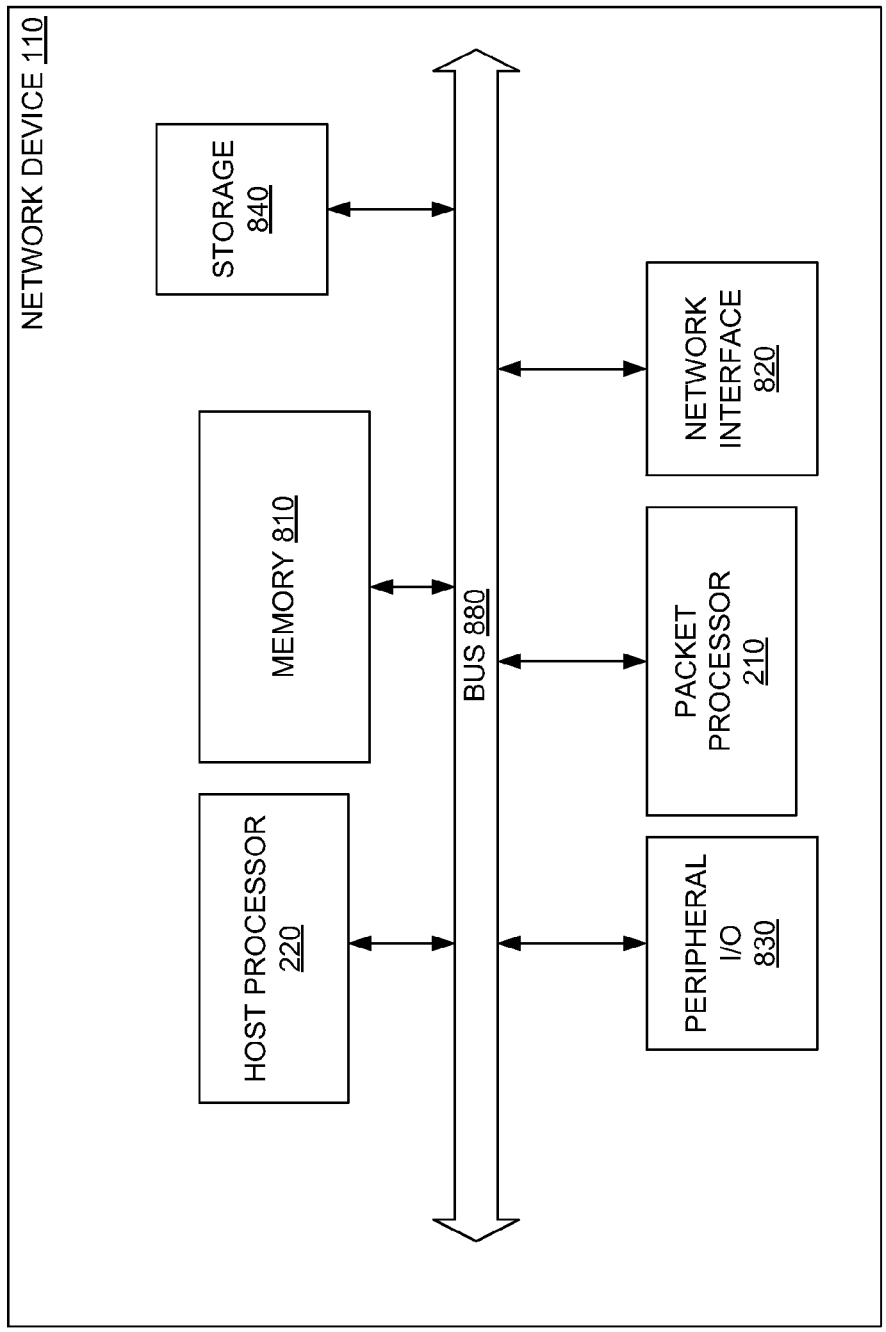
FIG. 8 is a block diagram of the network device from FIG. 1.

FIG. 8 is a block diagram of network device 110, according to some implementations disclosed herein. Network device 110 includes packet processor 210, host processor 220 memory 810, a network interface 820, a peripheral input output (I/O) interface 830, and storage device 840 (e.g., non-volatile memory or a disk drive). These components are coupled via a bus 850. Omitted from FIG. 8 are a number of components that are unnecessary to explain the operation of network device 1100.

Access control logic 230 and access control violation reporting logic 240 can be implemented in hardware logic, software (i.e., instructions executing on a processor), or a combination thereof. Hardware embodiments includes (but are not limited to) a programmable logic device (PLD), programmable gate array (PGA), field programmable gate array (FPGA), an application-specific integrated circuit (ASIC), a system on chip (SoC), and a system in package (SiP).

When implemented as software, access control logic 230 and/or access control violation reporting logic 240 can be embodied in any computer-readable medium for use by or in connection with any processor which fetches and executes instructions. In the context of this disclosure, a "computer-readable medium" can be any means that can contain or store the program for use by, or in connection with, the processor. The computer readable medium can be based on electronic, magnetic, optical, electromagnetic, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) an optical fiber and a portable compact disk read-only memory (CD-ROM).

The software components illustrated herein are abstractions chosen to illustrate how functionality is partitioned among components in some embodiments of various systems and methods of deferred error recovery disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods for handling access violations are described herein in terms of code and data, rather than with reference to a particular hardware device executing that code. Furthermore, the systems and methods can be implemented in any programming language, and executed on any hardware platform.

The flow charts herein provide examples of the operation of various software components, according to embodiments disclosed herein. Alternatively, these diagrams may be viewed as depicting actions of an example of a method implemented by such software components. Blocks in these diagrams represent procedures, functions, modules, or portions of code which include one or more executable instructions for implementing logical functions or steps in the process. Alternate embodiments are also included within the scope of the disclosure. In these alternate embodiments, functions may be executed out of order from that shown or discussed, including substantially concurrently or in reverse order, depending on the functionality involved. Not all steps are required in all embodiments.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and describe in order to best explain the principles of the invention and its practical applications, to thereby enable others skilled in the art to best utilize the invention and various embodiments with various modifications as are suited to the particular use contemplated.

What is claimed is:

1. A method of handling access violations in a network device, the method comprising:
   setting, by at least one processor, a forwarding index field in a specific entry of an access control list (ACL) to reference a specific forwarding table entry (FTE), the specific FTE being the only FTE associated with reporting access violations;
   setting, by the at least one processor, a next destination field in the specific FTE to indicate a copy-to-host processor operation; and
   responsive to a timeout on a timer associated with reporting access violations, setting, by the at least one processor, the next destination field in the specific FTE to indicate a drop operation.

2. The method of claim 1, further comprising:
   responsive to invocation of the copy-to-host processor operation, reporting an access violation.

3. The method of claim 1, further comprising:
   responsive to invocation of the copy-to-host processor operation, using data associated with the specific entry in the ACL to report an access violation.

4. The method of claim 1, wherein the setting the forwarding index field is responsive to a request to enable reporting for all access violations.

5. The method of claim 1, further comprising:
   starting the timer associated with reporting access violations after setting the next destination field in the specific FTE to indicate the copy-to-host processor operation.

6. A method of handling access violations in a network device, the method comprising:
   setting, by at least one processor, a forwarding index field in a specific entry of an access control list (ACL) to reference a specific one of a plurality of forwarding table entries (FTEs), the plurality of FTES associated with reporting access violations for a group of entries in the ACL;
   setting, by the at least one processor, a next destination field in the specific one of the FTEs to indicate a copy-to-host processor operation; and
   responsive to a timeout on a timer associated with reporting access violations for the group of entries in the ACL, setting, by the at least one processor, the next destination field in the specific one of the FTEs to indicate a drop operation.

7. The method of claim 6, further comprising:
   responsive to invocation of the copy-to-host processor operation, reporting an access violation.

8. The method of claim 6, further comprising:
   responsive to invocation of the copy-to-host processor operation, using data associated with the specific entry in the ACL to report an access violation.

9. The method of claim 6, wherein the setting the forwarding index field is responsive to a request to enable reporting for access violations for the group of entries in the ACL.

10. The method of claim 6, further comprising:
    after the setting the next destination field in the specific FTE to indicate the copy-to-host processor operation, starting the timer associated with reporting access violations for the group of entries in the ACL.

11. A network device comprising:
    a packet processor;
    memory having instructions stored thereon;
    a processor configured by the instructions to configure the packet processor to:
    set a forwarding index field in a specific entry of an access control list (ACL) to reference a specific one of a plurality of forwarding table entries (FTEs), the plurality of FTES associated with reporting access violations for a group of entries in the ACL;
    set a next destination field in the specific one of the FTEs to indicate a copy-to-host processor operation; and
    responsive to a timeout on a timer associated with reporting access violations for the group of entries in the ACL, set the next destination field in the specific one of the FTEs to indicate a drop operation;
    wherein the packet processor is configured to utilize the ACL and the fowarding table to determine an access violation caused by a packet which matches one of the entries in the ACL, and to either drop the packet or copy the packet to the host processor in accordance with the operation specified by the next destination field in the FTE that is referenced by the matching one of the ACL entries.

12. The network device of claim 11, wherein the processor is further configured by the instructions to:
    report an access violation responsive to invocation of the copy-to-host processor operation.

13. The network device of claim 11, wherein the processor is further configured by the instructions to:
    use data associated with the specific entry in the ACL to report an access violation, responsive to invocation of the copy-to-host processor operation.

14. The network device of claim 11, wherein the setting the forwarding index field is responsive to a request to enable reporting for access violations for the group of entries in the ACL.

15. The network device of claim 11, wherein the processor is further configured by the instructions to:
    after the setting the next destination field in the specific FTE to indicate the copy-to-host processor operation, start the timer associated with reporting access violations for the group of entries in the ACL.

* * * * *

UNITED STATES PATENT AND TRADEMARK OFFICE
CERTIFICATE OF CORRECTION

PATENT NO.         : 7,924,717 B2
APPLICATION NO.    : 12/394466
DATED              : April 12, 2011
INVENTOR(S)        : Hrishikesh Narasimhan It is certified that error appears in the above-identified patent and that said Letters Patent is hereby corrected as shown below:

In column 8, line 26, in Claim 11, delete "fowarding" and insert -- forwarding --, therefor.

Signed and Sealed this
Twenty-fifth Day of September, 2012

David J. Kappos
*Director of the United States Patent and Trademark Office*